(12) United States Patent
Beckett et al.

(10) Patent No.: US 8,463,478 B2
(45) Date of Patent: Jun. 11, 2013

(54) METHOD AND APPARATUS FOR CONTROLLING A HYBRID DRIVE APPARATUS

(75) Inventors: Andrew G Beckett, Regensburg (DE); Mathias Deiml, Donaustauf (DE)

(73) Assignee: Continental Automotive GmbH, Hannover (DE)

( * ) Notice: Subject to any disclaimer, the term of this patent is extended or adjusted under 35 U.S.C. 154(b) by 84 days.

(21) Appl. No.: 13/257,405

(22) PCT Filed: Mar. 19, 2010

(86) PCT No.: PCT/EP2010/053624
§ 371 (c)(1),
(2), (4) Date: Sep. 19, 2011

(87) PCT Pub. No.: WO2010/106171
PCT Pub. Date: Sep. 23, 2010

(65) Prior Publication Data
US 2012/0010770 A1 Jan. 12, 2012

(30) Foreign Application Priority Data
Mar. 19, 2009 (DE) .......................... 10 2009 014 007

(51) Int. Cl.
*G06F 19/00* (2006.01)
(52) U.S. Cl.
USPC .......................................................... 701/22
(58) Field of Classification Search
USPC .......................................................... 701/22
See application file for complete search history.

(56) References Cited

U.S. PATENT DOCUMENTS

| | | | |
|---|---|---|---|
| 6,173,226 B1 * | 1/2001 | Yoshida et al. | 701/51 |
| 6,394,208 B1 | 5/2002 | Hampo et al. | |
| 6,859,711 B2 * | 2/2005 | Eckert et al. | 701/70 |
| 7,021,410 B2 * | 4/2006 | Hughes | 180/65.25 |
| 7,219,757 B2 * | 5/2007 | Tomita et al. | 180/65.275 |
| 7,270,205 B2 * | 9/2007 | Sakai et al. | 180/65.6 |
| 7,451,850 B2 * | 11/2008 | Tokunou | 180/242 |

(Continued)

FOREIGN PATENT DOCUMENTS

| | | |
|---|---|---|
| DE | 4232974 A1 | 4/1994 |
| DE | 102005055001 A1 | 5/2007 |

(Continued)

*Primary Examiner* — Thomas Tarcza
*Assistant Examiner* — Alex C Dunn
(74) *Attorney, Agent, or Firm* — Laurence A. Greenberg; Werner H. Stemer; Ralph E. Locher

(57) ABSTRACT

A hybrid drive apparatus has a first drive unit, a second drive unit, and a clutch by way of which the first drive unit and the second drive unit can be coupled. A method for controlling the hybrid drive apparatus includes decoupling the first drive unit and the second drive unit from each other, and operating the first drive unit at a no-load operating point. A first torque of the first drive unit is determined at the no-load operating point. The first and second drive units are coupled by way of the clutch. The first drive unit is then motored by the second drive unit at an operating point which corresponds to the no-load operating point. A second torque is determined, which is produced by the second drive unit, in order to motor the first drive unit at the operating point. Finally, a control of at least one of the drive units is adapted based on the difference between the first torque and the second torque.

8 Claims, 3 Drawing Sheets

U.S. PATENT DOCUMENTS

| | | |
|---|---|---|
| 2002/0052677 A1 | 5/2002 | Lasson et al. |
| 2004/0237681 A1* | 12/2004 | Wheals et al. ............... 74/335 |
| 2007/0179004 A1* | 8/2007 | Endo ............................ 475/116 |
| 2008/0210509 A1 | 9/2008 | Fenkart et al. |
| 2008/0300744 A1* | 12/2008 | Katsuta et al. ................ 701/22 |
| 2009/0011899 A1 | 1/2009 | Reuschel |
| 2010/0318269 A1* | 12/2010 | Yanakiev et al. ............. 701/55 |

FOREIGN PATENT DOCUMENTS

| | | |
|---|---|---|
| DE | 102006020434 A1 | 11/2007 |
| DE | 102008027071 A1 | 1/2009 |
| DE | 102008011082 A1 | 8/2009 |
| GB | 2271198 A | 4/1994 |
| JP | 60256028 A | 12/1985 |

* cited by examiner

METHOD AND APPARATUS FOR CONTROLLING A HYBRID DRIVE APPARATUS

BACKGROUND OF THE INVENTION

Field of the Invention

The present invention relates to a method and to an apparatus for controlling a hybrid drive apparatus.

Nowadays, motor vehicles are increasingly being used with a hybrid drive in order to reduce further the consumption of fuel. Motor vehicles with a hybrid drive have both an internal combustion engine and an electric drive which are used separately or together to drive the motor vehicle. In the hybrid drive systems, a distinction is made between a plurality of concepts which differ, in particular, in the performance capability of the electric drive. These include, for example, what is referred to as the "mild hybrid", and what is referred to as the "full hybrid". In the case of the "mild hybrid", the electric drive typically has a maximum power between 10 and 15 kilowatts and is used mainly to implement the stop/start operating mode, regeneration in the overrun operating mode and for assisting the internal combustion engine, for example when starting. In the "mild hybrid", there is no provision for the motor vehicle to be operated exclusively with the electric drive. In contrast, in the case of the "full hybrid", more powerful electric drives with significantly more than 15 kilowatts maximum power are used. In addition to the functions specified in the case of the "mild hybrid", in the case of the "full hybrid", it is also possible to drive the motor vehicle by means of the electric drive. In order to permit optional or combined operation of the motor vehicle by means of the electric drive and the internal combustion engine, both the internal combustion engine and the electric drive can be coupled to the drive train and the driven wheels. In most systems, the internal combustion engine and the electric drive can be optionally connected to one another or disconnected from one another by means of an automated clutch. The changeover between the operating modes, which occurs as a result of the opening and closing of the automated clutch, is to take place as unnoticeably as possible, for the passengers, that is to say without jolts. This requires the torques and the rotational speeds of the internal combustion engine and of the electric drive to be synchronized during a changeover of the operating modes in such a way that the transition between operating modes occurs in a largely torque-neutral fashion.

The torque control of the drives (electric drive and internal combustion engine) is generally carried out by a control apparatus in which corresponding torque models (empirical, physical) and a database are implemented in the form of software. The torque of the respective drive can be determined at every operating point by means of the torque models and the database. The database is created by corresponding test bench measurements which are, however, carried out on only a limited number of test specimens of the internal combustion engine and of the electric drive. In series production, fabrication tolerances and ageing effects can prevent the respectively determined database from matching every electric drive or every internal combustion engine. Fabrication tolerances and ageing effects of the mechanical and electrical components of the drive unit (internal combustion engine and electric drive) influence, in particular, what is referred to as the drag torque (loss torque) of the respective drive unit. The drag torque is understood here as the torque which is necessary to entrain the respective drive unit at a specific operating point by means of a further extraneous drive. The drag torque therefore includes all the loss torques of the drive unit. In particular friction losses play a role here. In internal combustion engines, the gas change losses are also significant. In electric drives, electromagnetic effects can also play a role. If the database which is determined does not match exactly all the electric motors and internal combustion engines which are used in series production, inaccuracies occur in the synchronization of the electric drive and of the internal combustion engine. These can lead to adverse effects on comfort during a changeover of the operating modes (i.e. during the coupling and decoupling of the electric drive and of the internal combustion engine).

BRIEF SUMMARY OF THE INVENTION

The object of the present invention is therefore to make available a method and an apparatus for controlling a hybrid drive apparatus by means of which the driving comfort of a motor vehicle with a hybrid drive apparatus can be improved.

This object is achieved by means of the method and the apparatus according to the independent claims. Advantageous refinements of the invention are the subject matter of the dependent claims.

The method as claimed is suitable for controlling a hybrid drive apparatus which has a first drive unit, a second drive unit and a clutch by means of which the first drive unit and the second drive unit can be optionally connected to one another or disconnected from one another. According to the method, the first drive unit and the second drive unit are decoupled from one another. The first drive unit is operated at a zero load operating point. A first torque of the first drive unit is determined at the zero load operating point. The first drive unit and the second drive unit are coupled via the clutch. The first drive unit is then entrained by the second drive unit at an operating point which corresponds to the zero load operating point. A second torque is determined which is produced by the second drive unit in order to entrain the first drive unit at this operating point. A controller of at least one of the drive units is adapted on the basis of a difference between the first torque and the second torque.

At the zero load operating point, the effective output torque (net torque at the output shaft) of the first drive unit is equal to zero. In addition, at the zero load operating point the drive unit is disconnected from a drive train, and is therefore, for example, in the idling mode. The indexed torque (the gross torque) of the first drive unit is therefore dimensioned at the zero load operating point in such a way that the induced torque precisely compensates the loss torques of the first drive unit. The sum of the indexed torque and the loss torques is zero. The calculated first torque of the first drive unit at the zero load operating point therefore corresponds to the sum of the loss torques of the first drive unit. This first torque can be determined, for example, by an assigned control apparatus on the basis of a torque model and a corresponding database. According to the invention, the drive units are coupled and the first drive unit is entrained by the second drive unit at an operating point which corresponds to the zero load operating point. For this purpose, the first drive unit is switched off, i.e. its energy supply is disconnected. A second torque of the second drive unit, which has to be applied by said drive unit in order to entrain the first drive unit at this operating point, is then determined. The first torque and the second torque are then compared with one another. Differences between the value of the first torque and the value of the second torque can arise from fabrication tolerances and ageing effects of the drive units. If the possibly occurring difference during the control of at least one of the drive units is then taken into account, these deviations can be compensated. As a result, the synchronization and the driving comfort can be increased during the coupling and decoupling of the two drive units.

In one refinement of the method as claimed in claim 2, the first drive unit is an internal combustion engine and the second drive unit is an electric drive.

In this case the internal combustion engine is entrained by means of the electric drive. The electric drive is particularly suitable for this since the operating point can be set very quickly and precisely.

In one refinement of the method as claimed in claim 3, the zero load operating point of the internal combustion engine is set by means of an idling controller.

By using the idling controller it is possible to carry out precise, fast and automated setting of the zero load operating point.

In one refinement of the method as claimed in claim 4, the actuators of the internal combustion engine whose position influences the drag torque of the internal combustion engine are each set, during the entrainment by the electric drive, to a position which corresponds to the position at the zero load operating point.

The position of many actuators, in particular of the actuators which are arranged in the intake section or in the exhaust section, has a considerable influence on the gas change losses of the internal combustion engine. The actuators may be, for example, a throttle valve, a swirl valve, a variable intake manifold, a variable inlet valve position and outlet valve position (stroke and phase), a variable exhaust gas valve etc. The positions which these actuators have assumed during the zero load operating point are therefore stored or frozen in order therefore to ensure precise determination of the drag torque by the electric drive.

In one refinement of the method as claimed in claim 5, the zero load operating point of the internal combustion engine is defined by the rotational speed thereof and the quantity of air taken in.

Since the detection of the rotational speed and the quantity of air taken in is also possible by means of corresponding sensors in the entrainment mode, the operating point of the internal combustion engine can be re-set precisely to the zero load operating point during the entrainment by the electric drive.

This also increases the precision during the determination of the drag torque at the zero load operating point.

In one refinement of the invention as claimed in claim 6, the first drive unit is an electric drive and the second drive unit is an internal combustion engine.

In this case, the electric drive is entrained by the internal combustion engine. The procedure takes place in an analogous fashion.

In one refinement of the method as claimed in claim 7, at least one characteristic diagram for calculating the torque of the respective drive unit is corrected in order to adapt the control of at least one of the drive units.

Possible differences between the determined first torque of the first drive unit and the determined second torque of the second drive unit can be taken into account in these characteristic diagrams in the form of correction terms. This is a simple, cost-effective and reliable method for matching the torque calculations of the two drive units to one another. In particular, characteristic diagrams which include the drag torque of the drive units can be used for this purpose.

A control device according to claim 8 is deigned to carryout the method according to claims 1 to 7. For this purpose, corresponding control functions in the form of software are implemented in the control device. With respect to the resulting advantages, reference is made to the statements regarding claims 1 to 7.

In the text which follows, the invention is explained in more detail on the basis of an exemplary embodiment and with reference to the appended figures, in which:

DESCRIPTION OF THE INVENTION

Figure 1:
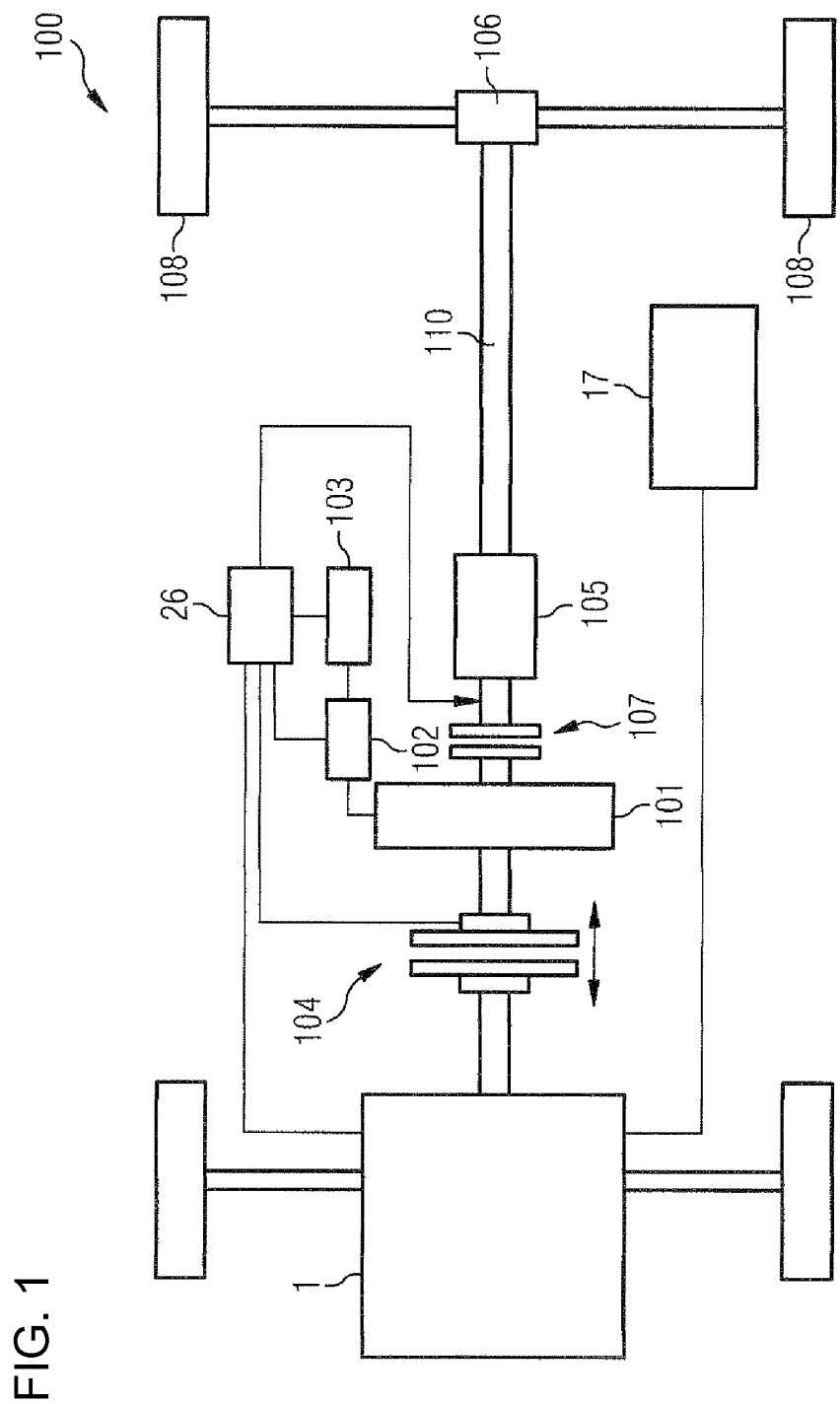
FIG. 1 shows a schematic illustration of a motor vehicle having a hybrid drive apparatus.

FIG. 1 is a schematic illustration of a motor vehicle 100 having a hybrid drive apparatus. The hybrid drive apparatus comprises here an internal combustion engine 1 as a first drive unit, an electric drive 101 as a second drive unit, and an automated clutch 104 by means of which the first drive unit and the second drive unit can be optionally coupled to one another or decoupled. The motor vehicle 100 also has a drive train which has a drive shaft 110, a transmission 105 integrated therein, an integrated differential 106 and a clutch 107 which can be activated mechanically by the motor vehicle driver or by transmission electronics (not illustrated). When the drive train is opened, i.e. when the clutch 107 is opened, the hybrid drive apparatus is decoupled from the drive shaft 110, with the result that the motor vehicle 100 cannot be propelled by means of the hybrid drive apparatus. When the drive train is closed, i.e. when the clutch 107 is closed, the hybrid drive apparatus is coupled to the drive shaft 110, with the result that a torque which is generated by the hybrid drive apparatus is transmitted via the clutch 107, the transmission 105, the drive shaft 110 and the differential 106 to drive wheels 108, with the result that the motor vehicle 100 is propelled.

The internal combustion engine 1 is also assigned a fuel supply device 17. The electric drive 101 is also assigned a rechargeable battery 103 for supplying power and a high power output stage 102 for electrically converting control signals.

The hybrid drive apparatus is also assigned a control device 26 which is connected to the automated clutch 104, the battery 103, the high power output stage 102 and to all the actuators which influence the torque of the internal combustion engine 1. In addition, the control device 26 is connected to all the sensors of the internal combustion engine 1, a position sensor (not illustrated) of the automated clutch 104, sensors (not illustrated) for detecting the rotational speed of the internal combustion engine 1 and of the electric drive 101, sensors for the current strength and the voltage which are fed to the electric drive 101. Furthermore, the control device 26 is connected to a sensor (not illustrated) for determining the batter capacity. Furthermore, the control device 26 is connected to a position sensor (not illustrated) of the clutch 107. In addition, software models, by means of which all the operational variables of the internal combustion engine 1 and of the electric drive 101 can be modeled on the basis of the sensor signals, are implemented in the control device 26, both for the internal combustion engine 1 and for the electric drive 101. These operational variables include, in particular, the indexed torque, the rotational speed, the torque loss and the net torque (output torque at the output shaft) of the internal combustion engine 1 and the output torque and the rotational speed of the electric drive 101. Furthermore, control functions in the form of software, by means of which all the manipulated variables of the internal combustion engine 1 and of the electric drive 101 can be influenced in order to generate a desired torque, are implemented in the control device 26.

Figure 2:
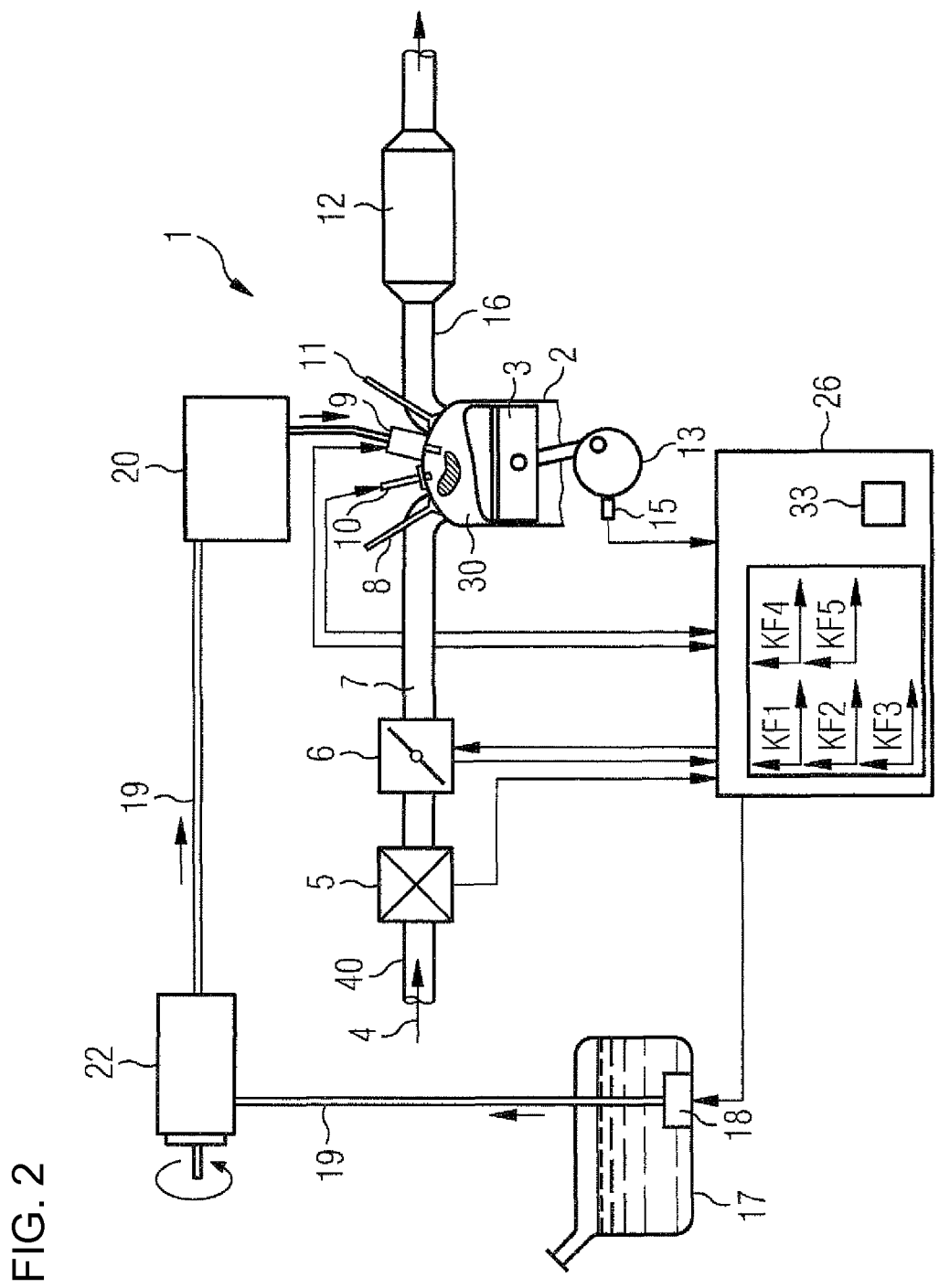
FIG. 2 shows a schematic illustration of an internal combustion engine of the hybrid drive apparatus.

FIG. 2 is a schematic illustration of the internal combustion engine 1 of the hybrid drive apparatus. For reasons of better clarity, the illustration is highly simplified.

The internal combustion engine 1 comprises at least one cylinder 2 and a piston 3 which can move to and fro in the cylinder 2.

The internal combustion engine 1 also comprises an intake section 40 in which an air mass flowrate sensor 5, a throttle valve 6 and an intake manifold 7 are arranged downstream of an intake opening 4 for taking in fresh air. The intake section 40 opens into a combustion chamber 30 which is bounded by the cylinder 2 and the piston 3. The fresh air which is necessary for combustion is introduced into the combustion chamber 30 via the intake section 40, wherein the fresh air supply is controlled by opening and closing an inlet valve 8. The internal combustion engine 1 illustrated here is an internal combustion engine 1 with fuel direct injection in which the fuel necessary for the combustion is injected directly into the combustion chamber 30 via an inlet valve 9. In order to trigger the combustion, a spark plug 10 which also projects into the combustion chamber 30 is used.

The combustion exhaust gases are carried away into an exhaust section 16 of the internal combustion engine 1 via an outlet valve 11 and are purified by means of an exhaust gas catalytic converter 12 which is arranged in the exhaust section.

The transmission of force to the drive train 110 of the motor vehicle 100 is carried out via a crankshaft 13 which (serves here as an output shaft of the internal combustion engine 1) which is coupled to the piston 3.

The internal combustion engine 1 also has a rotational speed sensor 15 for detecting the rotational speed of the crankshaft 13, and a fuel supply system, which has a fuel tank 17 and a fuel pump 18 which is arranged therein. The fuel is fed to a pressure accumulator 20 via a supply line 19 by means of the fuel pump 18. This is a common pressure accumulator 20, from which fuel to which pressure is applied is supplied to the injection valves 9 for a plurality of cylinders 2. In addition, a fuel filter 21 and a high pressure pump 22 are arranged in the supply line 19. The high pressure pump 22 serves to supply the fuel fed by the fuel pump 18 with a relatively low pressure (approximately 3 bar) to the pressure accumulator 20 at a high pressure (typically up to 150 bar).

The internal combustion engine 1 is assigned the control device 26 which is connected via signal lines and data lines to all the actuators and sensors of the internal combustion engine 1. The characteristic-diagram-based engine control functions (KF1 to KF5), in particular the torque model and an idling controller 33, are implemented in the control device 26. On the basis of the measured values of the sensors and the characteristic-diagram-based engine control functions, control signals are output to the actuators of the internal combustion engine 1 and of the fuel supply system.

Specifically, the control device 26 is coupled via data lines and signal lines to the fuel pump 18, the air mass flowrate sensor 5, the throttle valve 6, the spark plug 10, the injection valve 9 and the rotational speed sensor 15.

Figure 3:
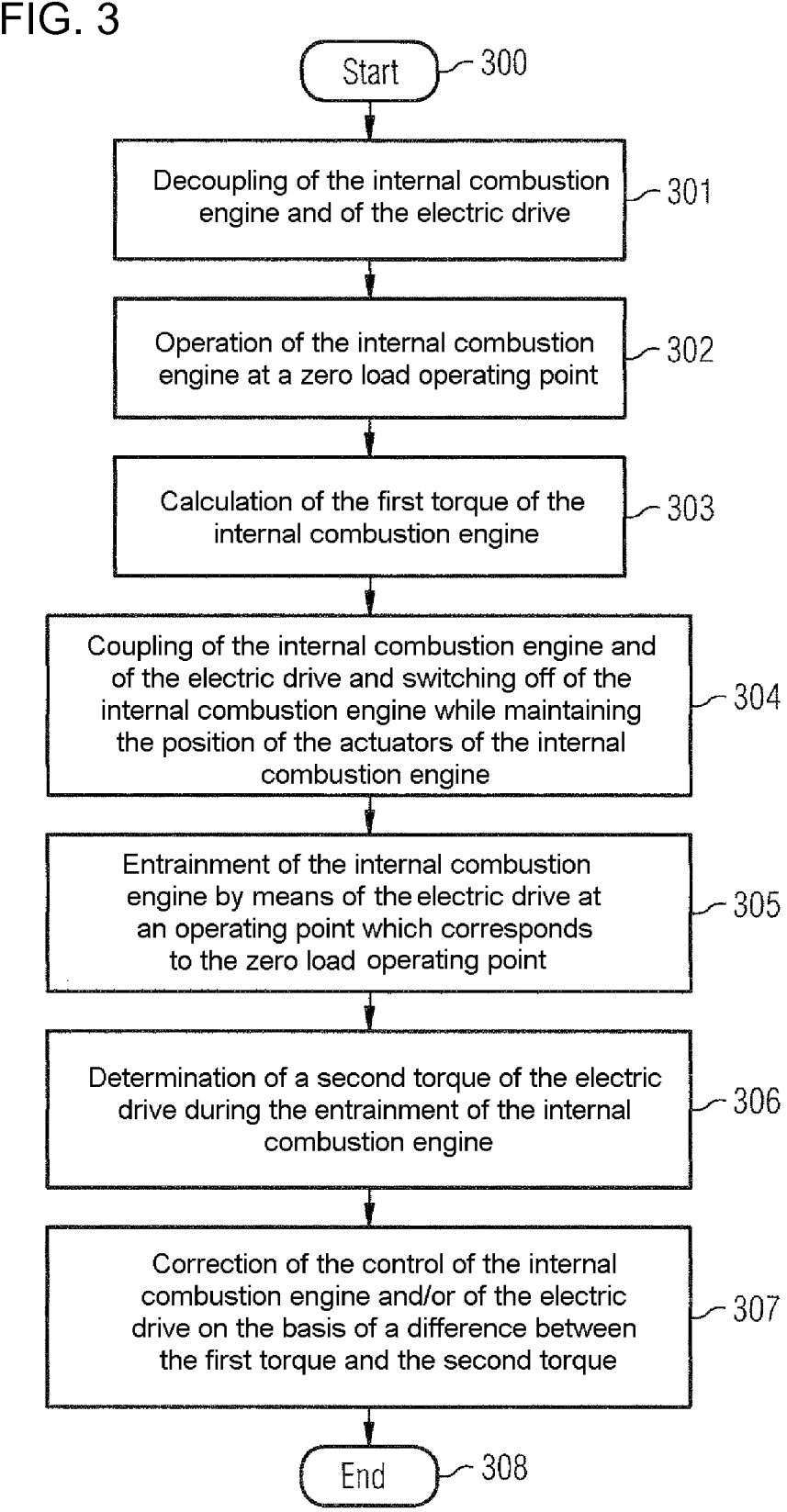
FIG. 3 shows an exemplary embodiment of the method according to the invention in the form of a flow chart.

FIG. 3 illustrates an exemplary embodiment of a method according to the invention for controlling the hybrid drive apparatus in the form of a flowchart.

The method is started in step 300, in a state in which the drive train of the motor vehicle 100 is opened (clutch 107 is opened). Such a state occurs, for example, when the vehicle waits at a red traffic light or rolls on a negative gradient, wherein in each case the clutch 107 and therefore the drive train are opened. In this state, the hybrid drive apparatus does not transmit any torque to the drive train.

If the automated clutch 104 is closed, the clutch 107 is then opened in step 301 and the internal combustion engine 1 is therefore decoupled from the electric drive 101.

In step 302, the internal combustion engine 1 is then adjusted to a predefined rotational speed by the control device 26 using the idling controller 33 implemented in the control device 26. Since the automated clutch 104 between the internal combustion engine 1 and the electric drive 101 is opened, the internal combustion engine 1 runs in a load-free state, that is to say the internal combustion engine 1 is decoupled away from the drive train and from the electric drive 101. The operating point which is set is referred to below as the zero load operating point since the (indexed) torque of the internal combustion engine 1 which is generated by the combustion of fuel is dimensioned at this zero load operating point in such a way that the inherent torque loss, which is composed mainly of the charge cycle losses and the friction losses, is compensated. At the output of the internal combustion engine 1, i.e. at the crankshaft 13, the torque at this zero load operating point is equal to zero. This zero load operating point, which occurs during the adjustment of the internal combustion engine 1 to a predefined rotational speed by means of the idling controller 33, is defined by the rotational speed and the quantity of air taken in by the internal combustion engine 1.

The method then continues with step 303 in which a first (indexed) torque is determined, which torque has to be generated by the internal combustion engine 1 at this zero load operating point in order to overcome the torque loss. The determination of this first torque is advantageously carried out by means of the torque model which is implemented in the control device 26. The first indexed torque of the internal combustion engine 1 which is calculated in this way corresponds to the sum of the inherent torque losses. These inherent torque losses are stored, for example in the form of a characteristic diagram, in the control device 26 as a function of the operating point (rotational speed and quantity of air). The first torque of the internal combustion engine 1 at the zero load operating point, which is calculated by the control device 26, therefore corresponds to the output value from this characteristic diagram. This characteristic diagram is provided with data by trial series on a very restricted number of test engines on the engine test bench. On the other hand, these data are used to control a large number of internal combustion engines in series production. Owing to fabrication-induced tolerances or ageing phenomena on the individual internal combustion engines, deviations may occur between the determined data and the actual torque loss of each individual internal combustion engine 1. In this case, the first torque which is determined from the characteristic diagram and the actual torque loss of the respective individual internal combustion engine 1 do not correspond.

The method continues with step 304 in which the internal combustion engine 1 and the electric motor drive are coupled in a fixed fashion with respect to the torque by closing the automated clutch 104, and the internal combustion engine 1 is switched off. In this context, the positions of the actuators of the internal combustion engine 1 which they already assumed during the zero load operating point are maintained. This is particularly important for actuators whose position has an influence on the torque loss of the internal combustion engine 1. These include, in particular, the actuators which are arranged in the intake section of the internal combustion engine 1, for example the throttle valve whose position significantly influences the charge cycle losses of the internal combustion engine 1. Further actuators which are not illustrated here would also be, for example, a swirl valve, a variable intake manifold, a variable valve controller (stroke and phase) as well as a switchable exhaust valve in the exhaust section.

In step 305, the internal combustion engine 1 is entrained by the electric drive 101 at an operating point which corresponds to the zero load operating point previously set by the internal combustion engine 1. Since the position of the actuators has been maintained, it is substantially sufficient if the internal combustion engine 1 is entrained by the electric drive 101 at the same rotational speed as at the zero load operating point. The air mass flowrate which is taken in is then set automatically.

In step 306, the control drive 26 determines a second torque of the electric drive 101 which the latter has to apply in order to entrain the internal combustion engine 1 at this operating point. The second torque can be calculated, for example, on the basis of the current strength or voltage fed to the electric drive 101.

In step 307, the first torque and the second torque are compared with one another. As has already been mentioned above, deviations can occur owing to fabrication tolerances or ageing effects, both on the part of the internal combustion engine 1 as well on the part of the electric drive 101. However, these deviations may be the cause of insufficient coordination of the torques of the internal combustion engine 1 and of the electric drive 101, which can have adverse effects on comfort, in particular during the coupling and decoupling of the two drives. For this reason, in step 307 a corresponding correction is performed during the control of the internal combustion engine 1 and/or of the electric drive 101, on the basis of a difference between the first and the second torques. This correction may be carried out, for example, by taking into account the difference between the first torque and the second torque as a correction variable in the determination of the torque for the internal combustion engine 1 and/or of the electric drive 101. Specifically, this difference could, for example, be input into the characteristic diagram for the torque loss of the internal combustion engine 1 at the respective operating point.

The method is ended with step 308 or, alternatively, started anew.

The method according to the invention permits precise determination of the torque controllers of the internal combustion engine 1 and of the electric drive 101. Discrepancies, which occur, for example, as a result of ageing effects or as a result of fabrication tolerances, can be carried out during the driving mode over the entire lifetime of the motor vehicle 100 or of the hybrid drive apparatus. The operating point at which the adjustment is to take place can be set in any desired fashion, since both the internal combustion engine 1 and the electric drive 101 are decoupled from the drive train.

It is to be noted that the procedure according to the flowchart in FIG. 3 can also be carried out in such a way that the internal combustion engine 1 and the electric drive 101 have interchanged functions. This means that the electric drive 101 (corresponding to step 302) is operated at a zero load operating point, a first torque for the electrical drive 101 is determined by means of the control device 26 (corresponding to step 303), the electric drive 101 is entrained by means of the internal combustion engine 1 (corresponding to step 305) after the coupling of the internal combustion engine 1 and of the electric drive 101 and after the switching off of the electric drive 101 (according to step 304), a second torque of the internal combustion engine 1 which is necessary to entrain the electric drive 101 (corresponding to step 306) is determined, and then the control is adapted (corresponding to step 307).

The invention claimed is:

1. A method of controlling a hybrid drive apparatus, the apparatus including a first drive unit, a second drive unit, and a clutch for selectively coupling the first drive unit and the second drive unit, the method which comprises:
    decoupling the first drive unit and the second drive unit from one another;
    operating the first drive unit at a zero load operating point;
    determining a first torque of the first drive unit at the zero load operating point;
    subsequently coupling the first drive unit and the second drive unit to one another via the clutch;
    entraining the first drive unit by the second drive unit at an operating point that corresponds to the zero load operating point;
    determining a second torque that is produced by the second drive unit in order to entrain the first drive unit at the operating point; and
    adapting a control of at least one of the first and second drive units on a basis of a difference between the first torque and the second torque.

2. The method according to claim 1, wherein the first drive unit is an internal combustion engine and the second drive unit is an electric drive.

3. The method according to claim 2, which comprises setting the zero load operating point of the internal combustion engine by way of an idling controller.

4. The method according to claim 2, which comprises setting actuators of the internal combustion engine whose position influences a drag torque of the internal combustion engine, during entrainment by the electric drive, to a position that corresponds to a position at the zero load operating point.

5. The method according to claim 2, wherein the zero load operating point of the internal combustion engine is defined by a rotational speed thereof and a quantity of air taken in by the internal combustion engine.

6. The method according to claim 1, wherein the first drive unit is an electric drive and the second drive unit is an internal combustion engine.

7. The method according to claim 1, which comprises correcting at least one characteristic diagram for calculating a torque of the respective drive unit in order to adapt the control of at least one of the drive units.

8. In a hybrid drive apparatus having a first drive unit, a second drive unit, and a clutch configured to selectively couple the first drive unit and the second drive unit to one another, a controller for controlling the hybrid drive apparatus, the controller being embodied and equipped for carrying out the method according to claim 1.

* * * * *